(12) United States Patent
Laird

(10) Patent No.: US 11,644,079 B2
(45) Date of Patent: *May 9, 2023

(54) MULTI-MODE AIR SHOCK

(71) Applicant: Fox Factory, Inc., Braselton, GA (US)

(72) Inventor: Andrew Laird, Los Gatos, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,389

(22) Filed: Feb. 26, 2020

(65) Prior Publication Data

US 2020/0191227 A1 Jun. 18, 2020

Related U.S. Application Data

(63) Continuation of application No. 15/942,337, filed on Mar. 30, 2018, now Pat. No. 10,578,179.

(Continued)

(51) Int. Cl.
*F16F 9/02* (2006.01)
*F16F 9/46* (2006.01)
(Continued)

(52) U.S. Cl.
CPC ............ *F16F 9/0281* (2013.01); *B62K 25/04* (2013.01); *B62K 25/286* (2013.01); *B62K 25/30* (2013.01);
(Continued)

(58) Field of Classification Search
CPC .......... F16F 9/0281; F16F 9/0245; F16F 9/06; F16F 9/062; F16F 9/063; F16F 9/065;
(Continued)

(56) References Cited

U.S. PATENT DOCUMENTS 5,775,677 A * 7/1998 Englund ................ B60G 13/06
188/317
6,491,146 B1 12/2002 Yi et al.
(Continued)

FOREIGN PATENT DOCUMENTS

CN 207005176 U * 2/2018 .............. F16F 9/062
CN 107956833 A * 4/2018 ............ F16F 9/0281
(Continued)

OTHER PUBLICATIONS

European Search Report for European Application No. 20175262.3, 8 pages, dated Oct. 14, 2020 (Oct. 14, 2020).
(Continued)

*Primary Examiner* — Thomas J Williams

(57) ABSTRACT

A multi-mode air shock is disclosed herein. The air shock includes an air spring having a primary air chamber, and a damper having an insertion end to telescope within the primary air chamber and a coupler to couple with a portion of a vehicle. An adjuster housing is fixedly coupled to an end of the air spring opposite of the damper, the adjuster housing having a secondary air chamber in communication with the primary air chamber and a mounting structure to couple with a different portion of the vehicle. There is a bulkhead with a valve to open or close the fluid communication between the primary air chamber and the secondary air chamber. The air shock also includes a tertiary air chamber in fluid communication with the secondary air chamber but not in fluid communication with the primary air chamber except via the secondary air chamber.

17 Claims, 11 Drawing Sheets

Related U.S. Application Data

(60) Provisional application No. 62/490,407, filed on Apr. 26, 2017.

(51) Int. Cl.

| | | |
|---|---|---|
| *B62K 25/04* | (2006.01) | |
| *F16F 9/44* | (2006.01) | |
| *F16F 9/06* | (2006.01) | |
| *B62K 25/30* | (2006.01) | |
| *B62K 25/28* | (2006.01) | |

(52) U.S. Cl.
CPC ............ *F16F 9/0245* (2013.01); *F16F 9/062* (2013.01); *F16F 9/44* (2013.01); *F16F 9/461* (2013.01); *B62K 2025/044* (2013.01); *B62K 2025/045* (2013.01); *B62K 2025/048* (2013.01); *F16F 9/46* (2013.01); *F16F 2230/0005* (2013.01); *F16F 2230/0064* (2013.01); *F16F 2230/186* (2013.01); *F16F 2230/32* (2013.01); *F16F 2230/36* (2013.01)

(58) Field of Classification Search
CPC .. F16F 9/34; F16F 9/44; F16F 2230/32; F16F 2230/0064; F16F 2230/186; F16F 9/446; F16F 9/461; F16F 9/462; B62K 25/04; B62K 2025/045; B62K 2025/044; B62K 2025/048
See application file for complete search history.

(56) References Cited

U.S. PATENT DOCUMENTS

| | | | |
|---|---|---|---|
| 7,641,028 B2 | 1/2010 | Fox | |
| 10,393,205 B2 * | 8/2019 | Tao | ........ F16F 9/3214 |
| 10,578,179 B2 * | 3/2020 | Laird | ........ F16F 9/0281 |
| 2003/0234144 A1 | 12/2003 | Fox | |
| 2004/0000748 A1 * | 1/2004 | Bell | ........ B60G 15/12 |
| | | | 267/64.15 |
| 2013/0118847 A1 | 5/2013 | Krahenbuhl et al. | |
| 2013/0207355 A1 * | 8/2013 | Pavuk | ........ B60G 11/27 |
| | | | 280/124.157 |
| 2015/0034436 A1 | 2/2015 | McAndrews et al. | |
| 2015/0183487 A1 | 7/2015 | Tsai | |
| 2015/0323035 A1 * | 11/2015 | Coaplen | ........ F16F 9/065 |
| | | | 188/269 |
| 2018/0017127 A1 * | 1/2018 | Talavasek | ........ F16F 9/3271 |
| 2018/0313423 A1 | 11/2018 | Laird | |
| 2020/0191227 A1 * | 6/2020 | Laird | ........ F16F 9/44 |

FOREIGN PATENT DOCUMENTS

| | | | | |
|---|---|---|---|---|
| DE | 102014221989 A1 * | 5/2016 | ............ B62K 25/16 |
| EP | 0417695 A2 | 3/1991 | |
| JP | S59106308 A | 6/1984 | |

OTHER PUBLICATIONS

"Extended European Search Report for EP Application 18169484.5 dated Oct. 8, 2018, 10 pages".
Bennett, "First Ride Review: Fox Float X2 for 2017 Specialized Enduro", http://reviews.mtbr.com/first-ride-rev iew-fox-float-x2-for-2017-specialized-enduro, Apr. 5, 2017, 1-5.
European Search Report for European Application No. 21197242.7, 9 pages, dated Mar. 22, 2022.

* cited by examiner

MULTI-MODE AIR SHOCK

CROSS-REFERENCE TO RELATED APPLICATIONS

This application is a continuation application of and claims the benefit of co-pending U.S. patent application Ser. No. 15/942,337, filed Mar. 30, 2018, entitled "A MULTI-MODE AIR SHOCK" by Andrew Laird, assigned to the assignee of the present application, which is incorporated herein in its entirety by reference thereto.

The application Ser. No. 15/942,337 claims benefit of U.S. Provisional Patent Application Ser. No. 62/490,407, filed Apr. 26, 2017, entitled "DUAL CHAMBER GAS SPRING WITH TERTIARY CHAMBER" by Andrew Laird, assigned to the assignee of the present application, which is herein incorporated by reference in its entirety.

FIELD OF THE INVENTION

Embodiments of the invention generally relate to gas springs and more specifically to gas springs including a plurality of selectively combinable gas chambers for a plurality of travel modes.

BACKGROUND

Shock absorbers are used in numerous different vehicles and configurations to absorb some or all of a movement that is received at a first portion of a vehicle before it is transmitted to a second portion of the vehicle. For example, when a wheel hits a pothole the encounter will cause a significant impact and jolt on the wheel. However, by utilizing suspension components including one or more air shocks, the impact and jolt can be significantly reduced or even absorbed completely before it is transmitted to a person on a seat of the vehicle. However, depending upon the terrain being traversed, it can be valuable to be able to change the amount of shock absorption provided by the shock. For example, if a vehicle is traveling on a smooth road, the length of travel, stiffness, etc. for the shock would be a first shorter level of travel and higher stiffness to provide a high level of smooth road performance. However, if the same vehicle moves from the smooth road to off-road or a bumpy road, the length of travel, stiffness, etc. for the shock would be a second longer level of travel and reduced stiffness to provide better off-road performance.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Figure 1:
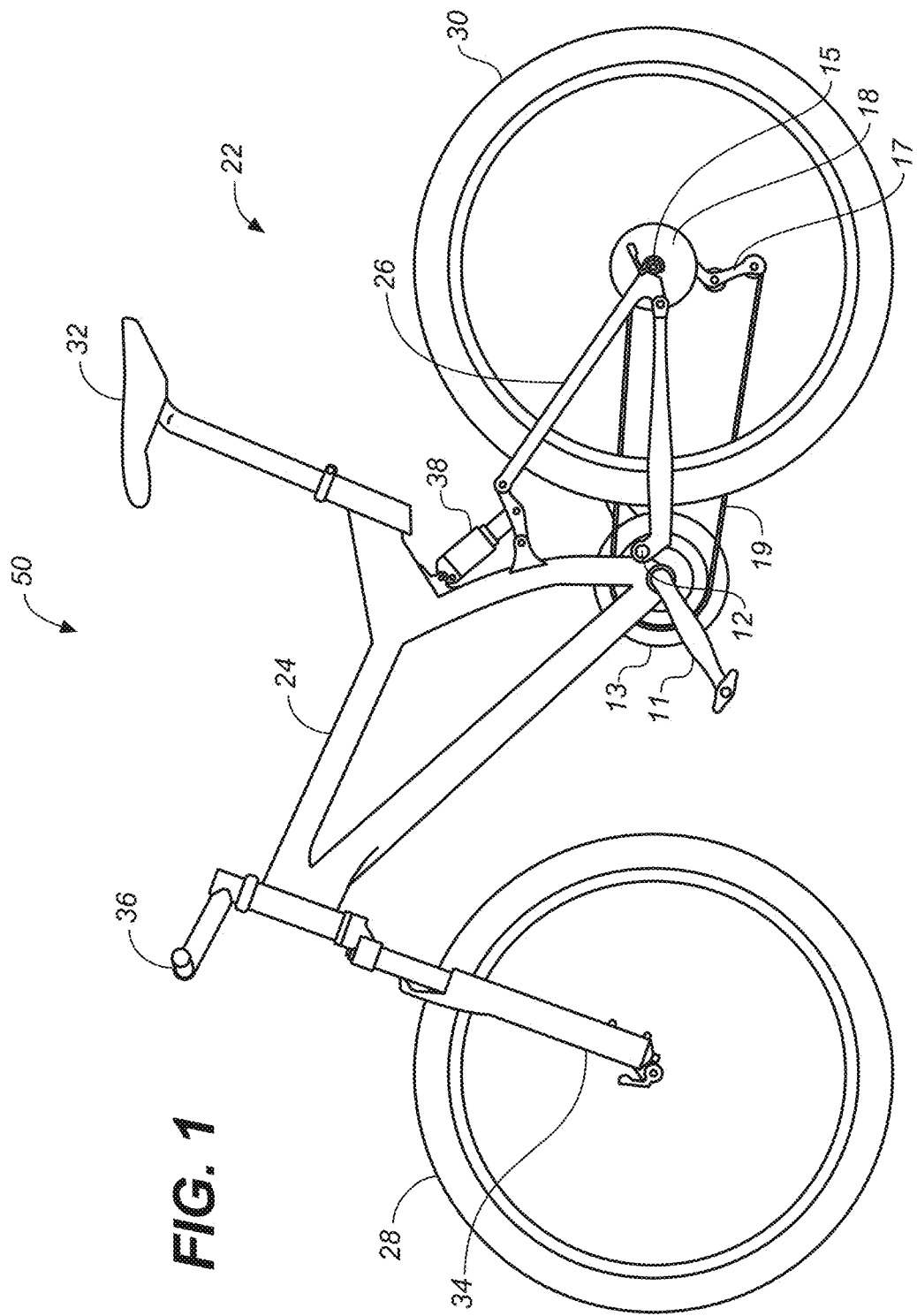
FIG. 1 is a perspective view of a bicycle having an air shock, in accordance with an embodiment.

FIG. 1 illustrates bicycle 50 having a main frame 24 with a suspension system comprising a swing arm portion 26 that, in use, is able to move relative to the rest of main frame 24; this movement is permitted by, inter alia, a rear shock 38. The front fork 34 also provides a suspension function via a damping assembly in at least one fork leg; as such the bicycle 50 is a full suspension bicycle (such as an MTB or mountain bike), although the embodiments described herein are not limited to use on full suspension bicycles. In particular, the term "suspension system" is intended to include vehicles having front suspension or rear suspension only, or both. In one embodiment, swing arm portion 26 is pivotally attached to the main frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the specific pivot point 12 herein is provided merely for purposes of clarity. Bottom bracket axis 11 is the center of the pedal and front sprocket assembly 13. Bicycle 50 includes a front wheel 28 which is coupled to the main frame 24 via front fork 34 and a rear wheel 30 which is coupled to the main frame 24 via swing arm portion 26. A seat 32 is connected to the main frame 24 in order to support a rider of the bicycle 20.

The front wheel 28 is supported by front fork 34 which, in turn, is secured to the main frame 24 by a handlebar assembly 36. The rear wheel 30 is connected to the swing arm portion 26 of the frame 22 at rear wheel axis 15. A rear shock 38 is positioned between the swing arm portion 26 and the frame 22 to provide resistance to the pivoting motion of the swing arm portion 26 about pivot point 12. Thus, the illustrated bicycle 50 includes a suspension member between swing arm portion 26 and the main frame 24 which operate to substantially reduce rear wheel 30 impact forces from being transmitted to the rider of the bicycle 50.

Bicycle 50 is driven by a chain 19 that is coupled with both front sprocket assembly 13 and rear sprocket 18. As the rider pedals the front sprocket assembly 13 is rotated about bottom bracket axis 11 a force is applied to chain 19 which transfers the energy to rear sprocket 18. Chain tension device 17 provides a variable amount of tension on chain 19.

Figure 2:
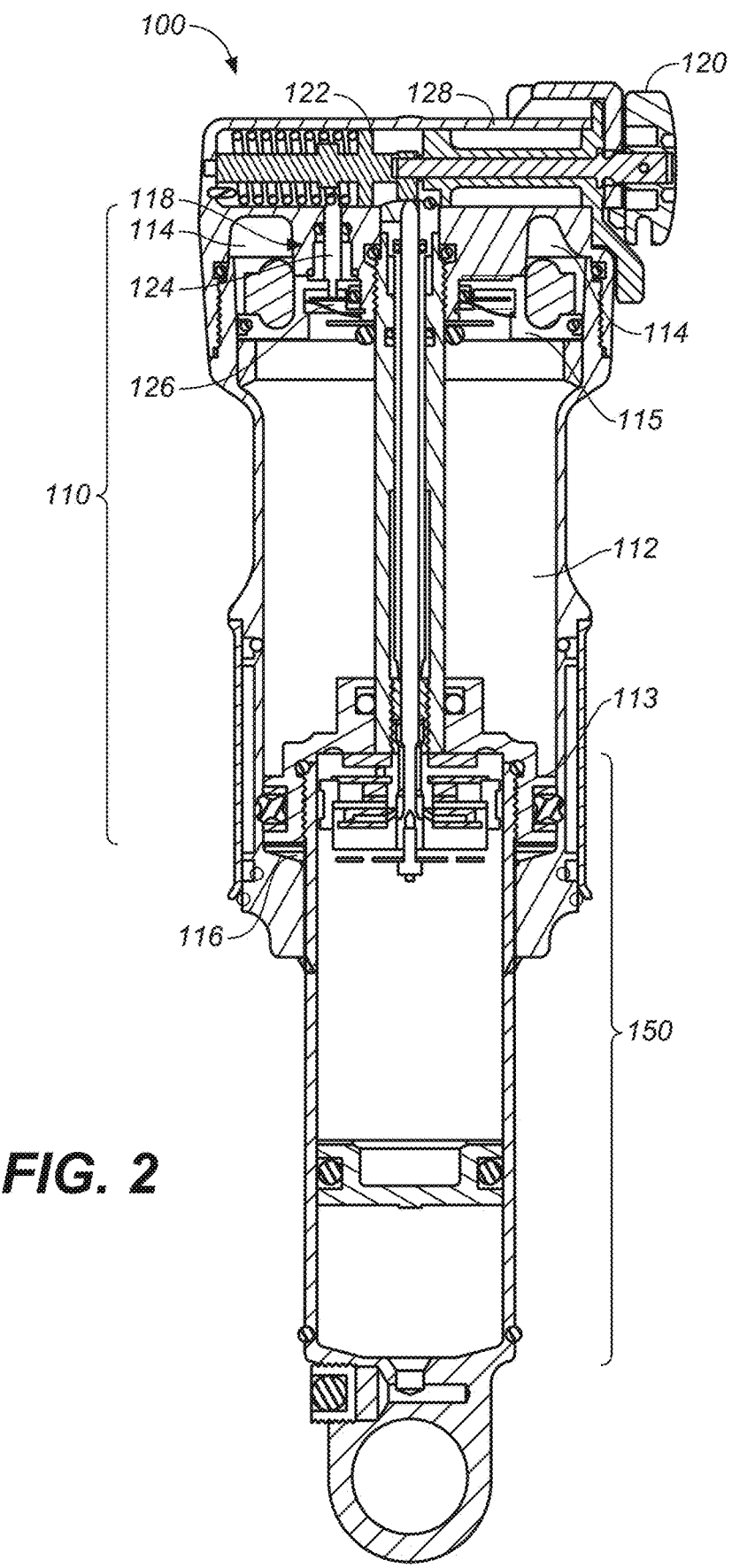
FIG. 2 is a cross-sectional view of a multi-mode air shock with primary and secondary air chambers, in accordance with an embodiment.

FIG. 2 illustrates an air shock 100 (which in one embodiment is similar to rear shock 38) with a spring portion 110 and a damper portion 150. The spring portion 110 is a gas spring or air spring. The spring portion 110 includes two positive air chambers: a primary air chamber 112 and a secondary air chamber 114. A negative air chamber 116 may also be utilized or a coil spring. A gas piston 113 separates the primary air chamber 112 from the negative air chamber 116. The gas piston 113 may be coupled with a telescoping damper portion 150. The primary air chamber 112 and the secondary air chamber 114 may be combined to provide two different compression ratios. A bulkhead 115 separates the primary air chamber 112 from the secondary air chamber 114. In one embodiment, one end of damper portion 150 couples with a portion of a vehicle, such as the frame, or the like. In one embodiment, the coupling could be with an eyelet, a strut, or the like.

Typically, the air shock 100 with two positive air chambers allows for communication between the chambers to be selectively closed by a valve 118 or some selectively adjustable flow path. For example, the valve 118 may include an adjuster 120 which rotates a cam 122 to position a needle 124 which displaces a check plate 126 to open or close ports in the bulkhead 115 that permits communication between the primary air chamber 112 and the secondary air chamber 114. This allows for a decreased compression ratio in the air spring when the valve is open and combining the primary air chamber 112 and secondary air chamber 114 and an increased compression ratio in the air spring when the valve is closed and sealing the primary air chamber 112 from the secondary air chamber 114. This allows for two different riding modes: short travel when the communication is closed and long travel when open.

Often, a relatively low compression ratio is desirable in the long travel mode when the primary air chamber 112 and the secondary air chamber 114 are combined. For example, a range of 2.5:1 to 4:1 may be common for the long travel mode. The primary air chamber is typically designed to be as small as possible to achieve a relatively high compression ratio in the short travel mode. For example, a range of 8:1 to 20:1 may be common for the short travel mode. Thus, the combined volume of the primary air chamber 112 and the secondary air chamber 114 must decrease the compression ratio by at least 50% and as much as 800%.

The size of the primary air chamber 112, however, may be restricted by the ability of the damper portion 150 to telescope within the primary air chamber 112. For example, lowering the bulkhead to decrease the length of the primary air chamber 112 and increase the length of the secondary air chamber 114 would decrease the overall travel of the air shock 100. The additional volume needed to decrease the compression ratio in long travel mode must be in communication with only the secondary air chamber 114 else the primary air chamber 112 will also experience a decreased compression ratio when in short travel mode.

Because the secondary air chamber 114 typically is in a mounting structure 128, such as a body cap, available volume for the secondary air chamber 114 may be limited. Furthermore, space surrounding the mounting structure 128 may be limited due to features of the vehicle on which the air shock 100 is mounted, such as seat posts and other structural support members of a bicycle. What is needed is an extra volume in communication with only the secondary air chamber 114 that does not interfere with other structures.

Figure 3:
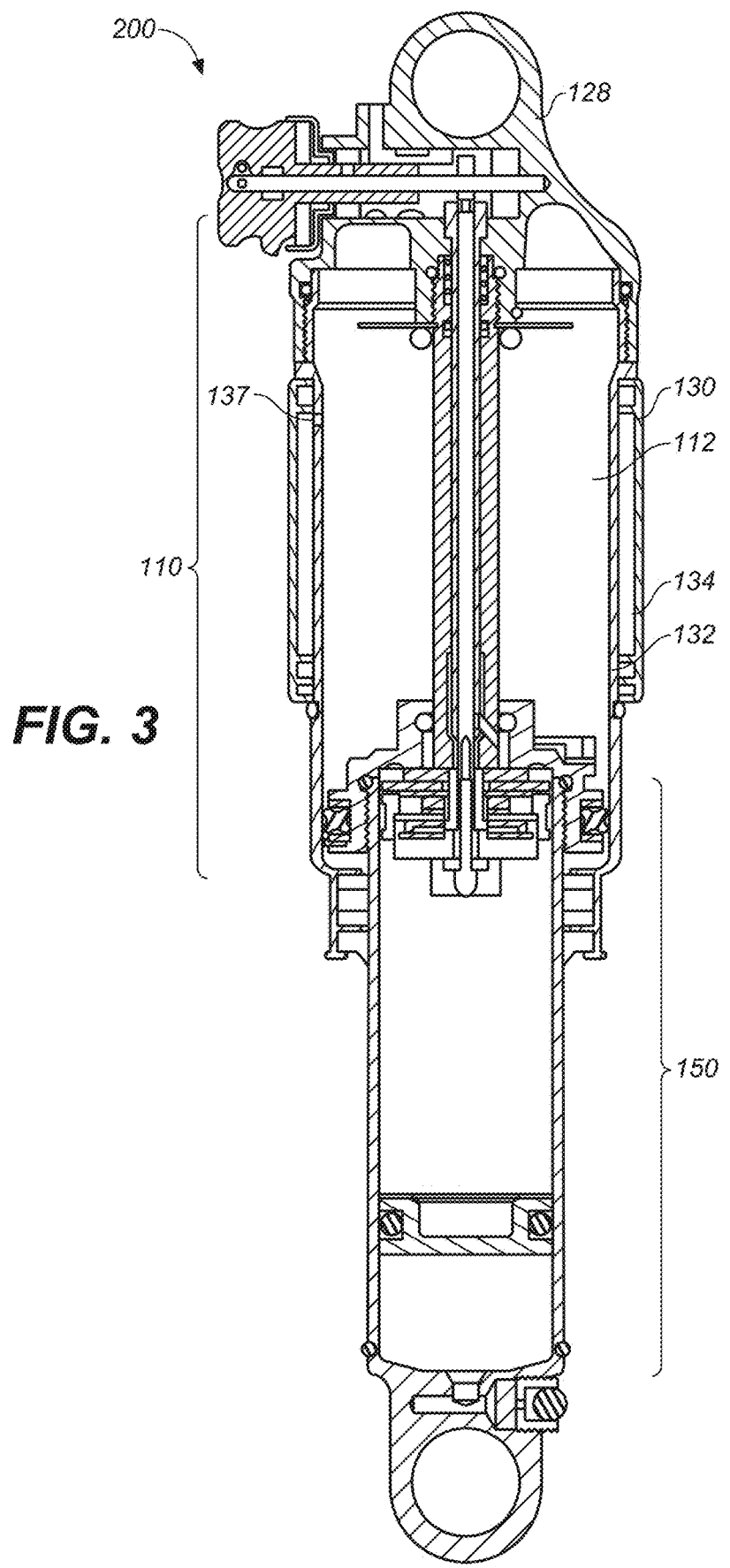
FIG. 3 is a cross-sectional perspective of a single mode air shock with an extra volume sleeve, in accordance with an embodiment.

On some air shocks, such as air shock 200 of FIG. 3 (which in one embodiment is similar to rear shock 38), extra volume may be added by including a positive air sleeve 130 which together with seals and an outer wall 132 of the primary air chamber 112, forms an extra volume (EV) chamber 134 as shown in FIG. 3. In the air shock 200 of FIG. 3, no secondary air chamber 114 is present. However, if the positive air sleeve 130 were added to the air shock 100 of FIG. 2, the volume of the EV chamber 134 would be added to the total volume of the air spring in both long and short travel modes. When the positive air sleeve 130 is added to the air shock 100, communication between positive air sleeve 130 and primary air chamber 112 occurs through communication port 137.

Figure 4:
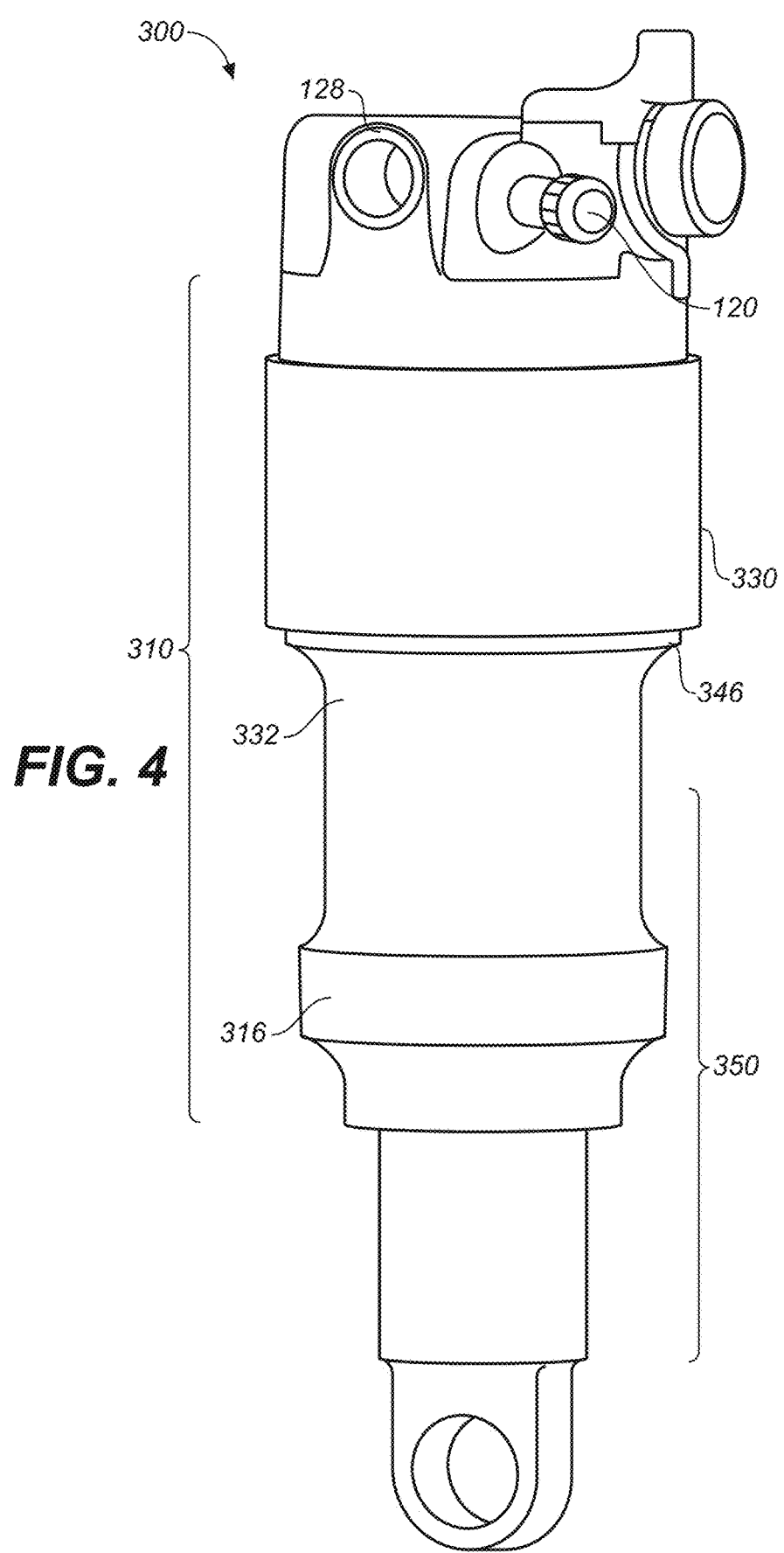
FIG. 4 is a perspective view of a multi-mode air shock with a tertiary air chamber, in accordance with an embodiment.
Figure 5:
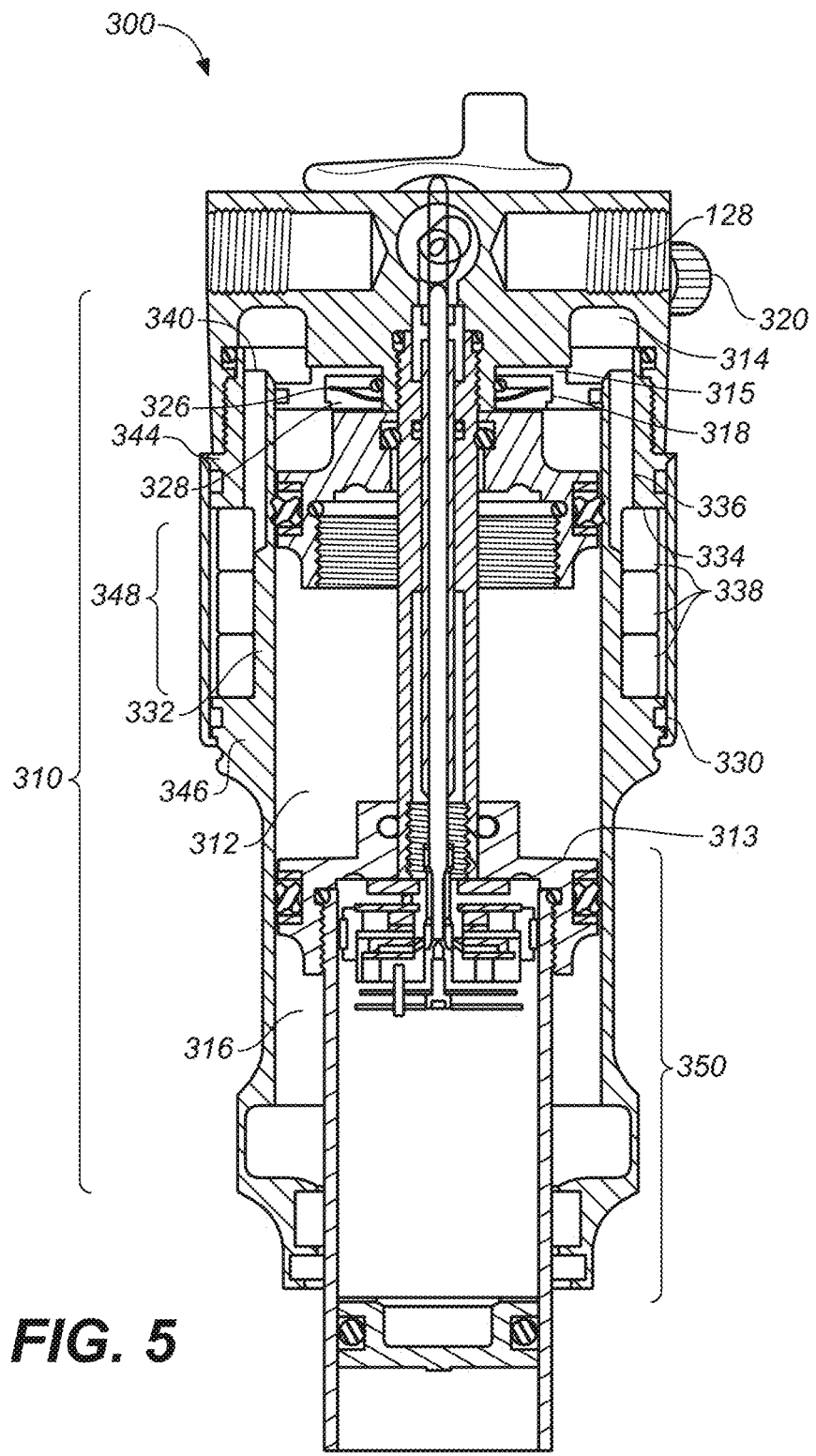
FIG. 5 is a cross-sectional side view of the multi-mode air shock of FIG. 4, in accordance with an embodiment.

Referring now, to FIGS. 4 and 5, an air shock 300 (which in one embodiment is similar to rear shock 38) of the present disclosure includes an air shock spring portion 310 with a primary air chamber 312, a secondary air chamber 314, and a tertiary air chamber 334. A gas piston 313 separates the primary air chamber 312 from a negative air chamber 316. The primary air chamber 312 selectively communicates with the secondary air chamber 314 by a valve 318 similar to air shock 100. For example, the valve 318 may include an adjuster 320 which rotates a cam to position a needle which displaces a check plate 326 to open or close ports 328 in the bulkhead 315 that permits communication between the primary air chamber 312 and the secondary air chamber 314. This allows for a decreased compression ratio in the air spring when the valve is open and combining the primary air chamber 312 and secondary air chamber 314 and an increased compression ratio in the air spring when the valve is closed and sealing the primary air chamber 312 from the secondary air chamber 314. This allows for two different riding modes: short travel when the communication is closed and long travel when open. The gas piston 313 may be coupled with a telescoping damper portion 350.

The tertiary air chamber 334 may be formed by addition of a sleeve 330 together with seals and an outer wall 332 of the primary air chamber 312. A flow path 336 may be formed within the outer wall 332 of the primary air chamber 312 to communicate the secondary air chamber 314 with the tertiary air chamber 334. The volume of the tertiary air chamber 334 may be adjusted using one or more volume spacers 338 that fill a portion of the tertiary air chamber 334. The volume spacers 338 may be comprised of a hard plastic, polymer, rubber, or other material that can remove some of the available volume within the tertiary air chamber 334 to alter a compression ratio of the air shock 300 when the secondary air chamber 314 is utilized. In one embodiment, tertiary air chamber 334 is a modular air sleeve removably coupled about an outside perimeter of at least a portion of the air spring.

The air shock 300 may include more flow paths 336 which may include multiple channels, passageways, and the like that are bored or machined from the outer wall 332. The flow paths 336 may extend from a top surface 340 of the outer wall 332, through a portion of the outer wall 332, and open on a radial surface of the outer wall 332. Radially extending ledges 344 and 346 may form an annular recess 348 in the outer wall 332 that communicates with the flow paths 336. Each ledge 344 and 346 may include seals to prevent air from exiting the tertiary air chamber 334. The sleeve 330 may be coupled with the ledges 344 and 346 to form a tertiary air chamber 334. The sleeve 330 may be removable. The sleeve 330 may include a plurality of sizes and shapes to accommodate various compression ratios as well as various fitments depending on the application.

The tertiary air chamber 334 only communicates with the secondary air chamber 314. Thus, the compression ratio of the air shock 300 in a short travel mode is unaffected by the added volume of the tertiary air chamber 334. That is, in a short travel mode, when the primary air chamber 312 does not communicate with the secondary air chamber 314, the compression ratio of the air shock spring portion 310 depends solely upon the volume of the primary air chamber 312. In a long travel mode, when the primary air chamber 312 does communicate with the secondary air chamber 314, the compression ratio of the air shock spring portion 310 depends upon the volume of the primary air chamber 312, the secondary air chamber 314, the tertiary air chamber 334, and any volume spacers 338 which may be present. The compression ratio in long travel mode may be adjustable without affecting short travel mode.

One of the benefits of the annular design is that it allows a user to remove the sleeve 330. After a retaining ring is removed the user will take off the sleeve and have access to add or remove volume spacers 338. Another way to get a lower compression ratio is to make the air chamber larger and add more room in the region. However, in an enlarged air chamber design it would not be as easy to access the air chamber to add or remove spacers. Thus, by putting the variable volume of tertiary air chamber 334 on the sleeve 330 a user is able to adjust the volume much more readily than if the user had to disassemble the shock to obtain access to the air chamber.

Figure 6:
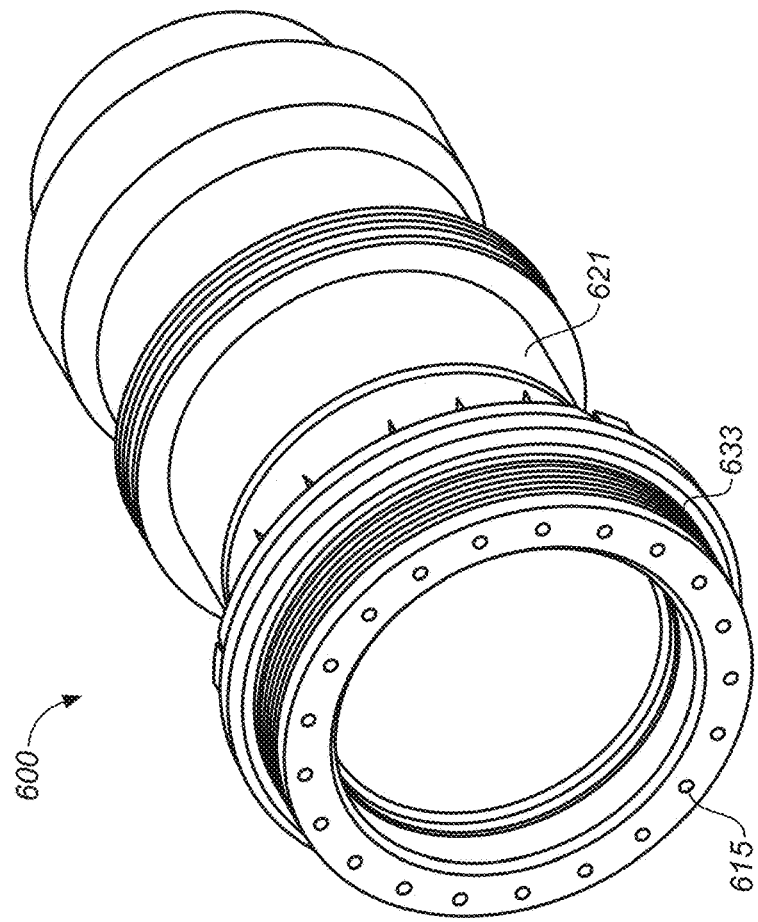
FIG. 6 is a perspective view of a tubular outer wall, in accordance with an embodiment.

FIG. 6 is a perspective view of a tubular outer wall 600, in accordance with an embodiment. In one embodiment, tubular outer wall 600 includes holes 615 about the perimeter of tubular outer wall 600, threads 633, and a depression 621 in tubular outer wall 600. In one embodiment, depression 621 is created in a central exterior portion of the tubular outer wall 600. Threads 633 are formed by threading an outside portion of one end of the tubular outer wall 600, the threading stopping before depression 621 to form a threaded portion as shown covered by threads 633.

In general, holes 615 are milled. That is, milling a pattern of holes 615 axially through the threaded portion of the tubular outer wall 600 is performed. The pattern of holes 615 proceeding from at an exterior end of the threaded portion of the tubular outer wall 600 through to depression 621. The pattern of holes 615 running within the tubular outer wall 600 and perpendicular to the threading, e.g., threads 633 thereon. In general, holes 615 allow air flow between secondary air chamber 314 and tertiary air chamber 334. While one of holes 615 will house plunger 1102. Moreover, as described herein, shim 1120 will block the air flow through holes 615.

In one embodiment, depression 621 is what creates the tertiary air chamber 334 space when air shock 800 is assembled. By utilizing the tertiary air chamber 334 and the ability to cut off communication between tertiary air chamber 334 and secondary air chamber 314 the compression ratio in long travel mode can be lowered from approximately 3.6:1 to 2.8:1 or the like, to better suit longer travel shocks/bikes.

Figure 7:
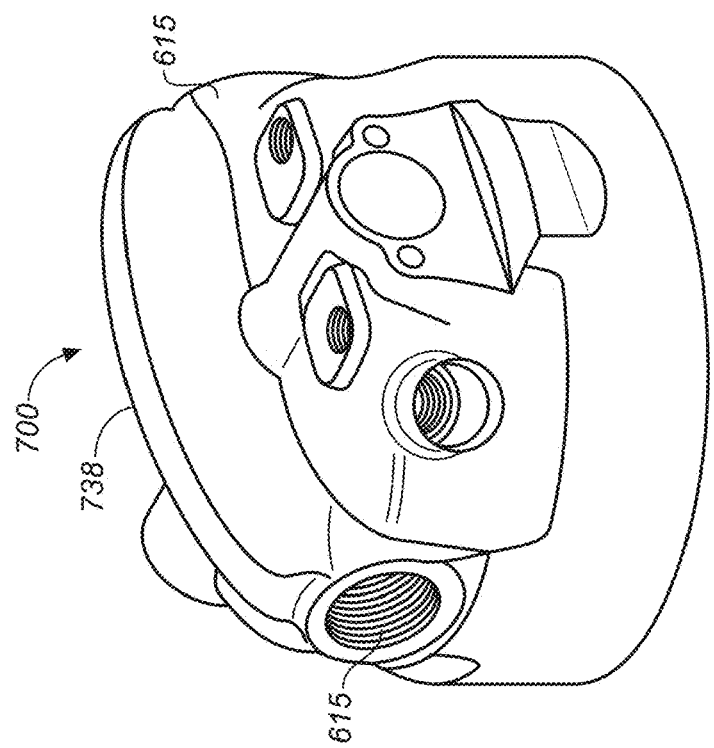
FIG. 7 is a perspective view of a gusset adjuster housing, in accordance with an embodiment.

FIG. 7 is a perspective view of a gusset adjuster housing 700, in accordance with an embodiment. In one embodiment, gusset adjuster housing 700 has the two opposing threaded holes, but additional structure 738 providing additional rigidity and strength has been added. In one embodiment, the additional structure 738 has been added to the top and also to the trunnion bosses. In one embodiment, additional structure 738 is shaped like a fin. Although a fin shape is shown, it should be appreciated that additional structure 738 could be added in any number of different shapes. The use of the fin is provided merely as an example. In one embodiment, additional structure 738 (e.g., the fin) is used to increase the structural integrity of gusset adjuster housing 700 and as such, reduce the opportunity for the tubular outer wall 600 to separate from gusset adjuster housing 700.

Figure 8:
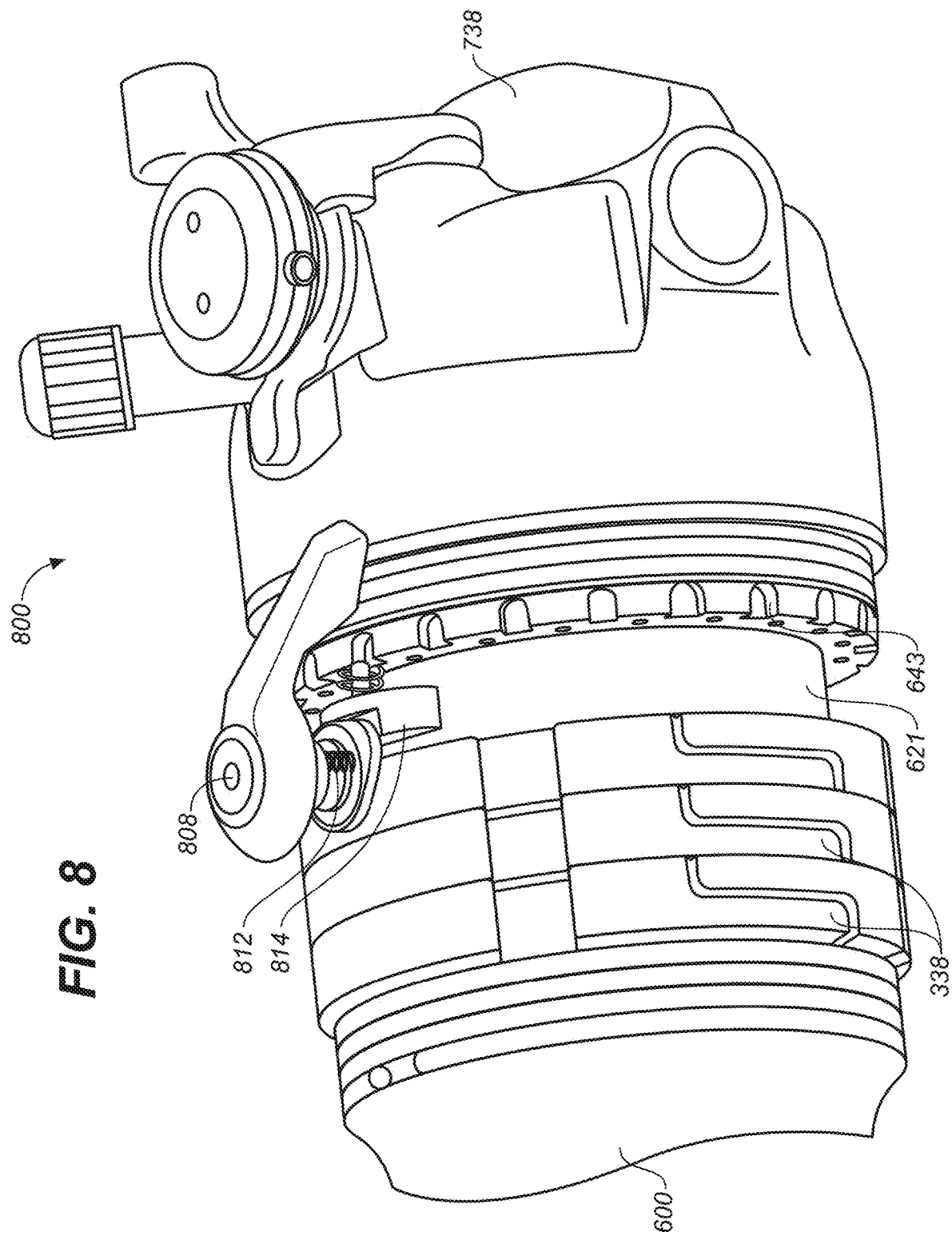
FIG. 8 is a perspective view of the tubular outer wall coupled with a gusset adjuster housing and having one or more volume adjusting spacers and a lever, in accordance with an embodiment.

FIG. 8 is a perspective view of a tubular outer wall coupled with a gusset adjuster housing 700 and having one or more volume spacers 338, in accordance with an embodiment. In one embodiment, volume spacers 338 are plastic although they could be made from other material. In one embodiment, the volume spacers 338 are provided at the non-travel end. As such, they do not limit the travel of the shock but they are used to adjust the amount of air volume in the chamber. As the shock stroke length increases with different frame models, the adjuster housing design is typically the same for part reuse. To accommodate the different lengths of travel, volume spacers 338 are used to adjust the compression ratio as needed. The design of adjuster housing and whole package is done knowing the travel distances needed and the compression ratios needed.

FIG. 8 also includes a lever 808 affixed to a cam 812 (e.g., keyed with cam 812). The cam 812 rotates nominally 60-70 degrees with the lever 808. The cam 812 lifts the cam follower 814. In one embodiment, cam follower 814 has support wings that extend out on both sides of the cam follower 814 so that the cam follower 814 does not rock or twist about its axis as the lever 808 is utilized. One embodiment translates, via cam follower 814, a rotational movement of cam 812 into a linear movement. In one embodiment, plunger 1102 is installed, e.g., threaded or otherwise coupled with cam follower 814, after tubular outer wall 600 is fixedly attached to gusset adjuster housing 700. The volume spacers 338 can also be added at that time or at a later time. FIG. 8 also shows milled features 643. In general, milled features 643 are a pattern of indentations milled into the tubular outer wall 600 on a side of depression 621 opposite and offset from the pattern of holes 615.

Figure 9:
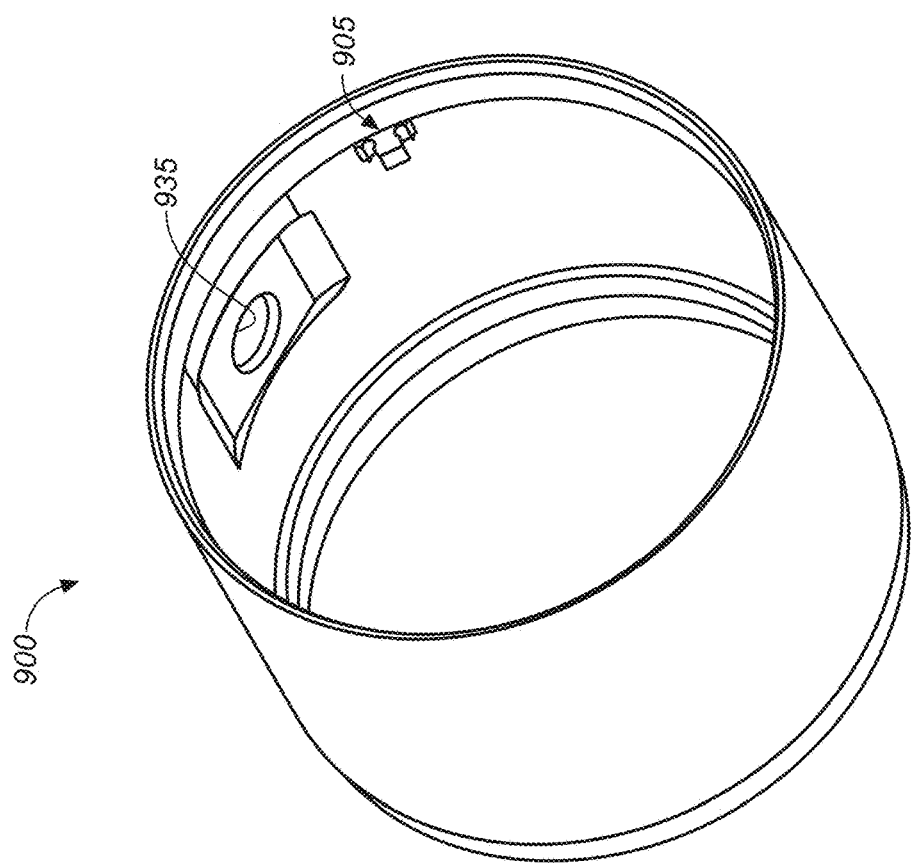
FIG. 9 is a perspective view of the inside of a sleeve, in accordance with an embodiment.

FIG. 9 is a perspective view of the inside of a sleeve 900, in accordance with an embodiment. During manufacture of sleeve 900 a tab 905 is formed in the interior of sleeve 900, e.g., on an internal side of sleeve 900. In general, tab 905 provides clocking with one of milled features 643 which allows lever 808 to be oriented close to front of air shock 800, and maintains alignment between cam 812 and cam follower 814.

Figure 10:
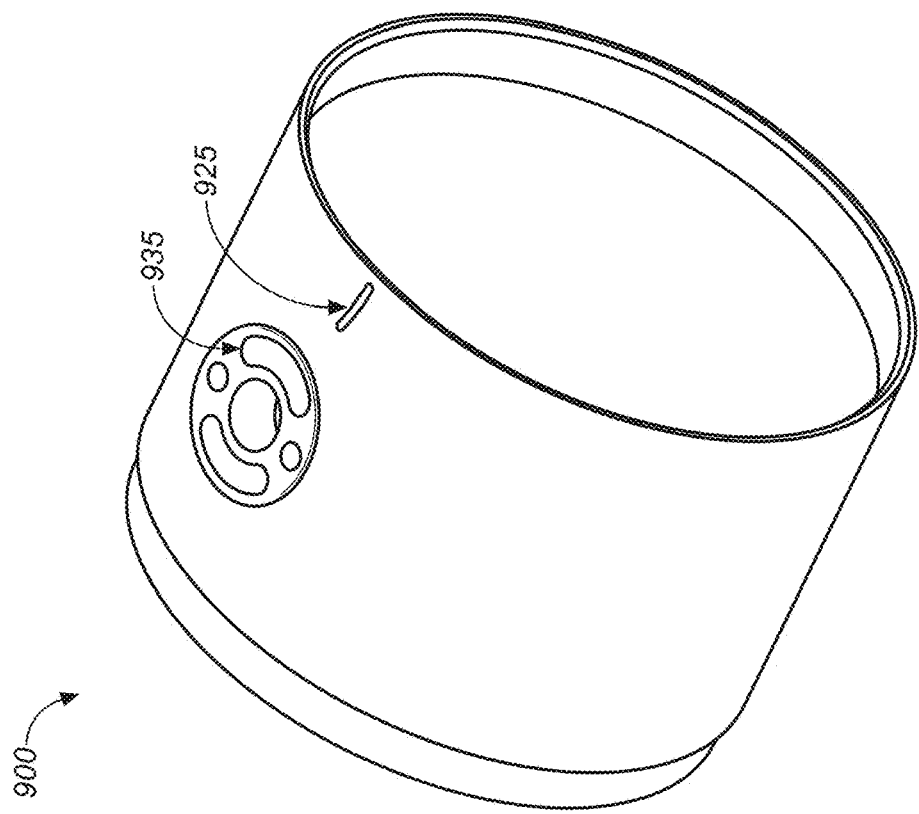
FIG. 10 is a perspective view of the outside of the sleeve, in accordance with an embodiment.

FIG. 10 is a perspective view of the outside of sleeve 900, in accordance with an embodiment. In one embodiment, a groove 925 and lever boss 935 (e.g., lever hole and detent) are formed on the exterior of sleeve 900.

During assembly of air shock 800, sleeve 900 is slid over tubular outer wall 600. In one embodiment, groove 925 on the exterior of sleeve 900 acts as guide to align the lever boss 935 with the plunger 1102 during installation, e.g., when sleeve 900 is slid over tubular outer wall 600. While using groove 925 for alignment, tab 905 will fit into one of the milled features 643 of tubular outer wall 600 and key sleeve 900 to tubular outer wall 600 in proper orientation. That is, tab 905 allows the lever 808 to be oriented close to the front of the air shock 800 and also maintains alignment between cam 812 and cam follower 814.

Figure 11:
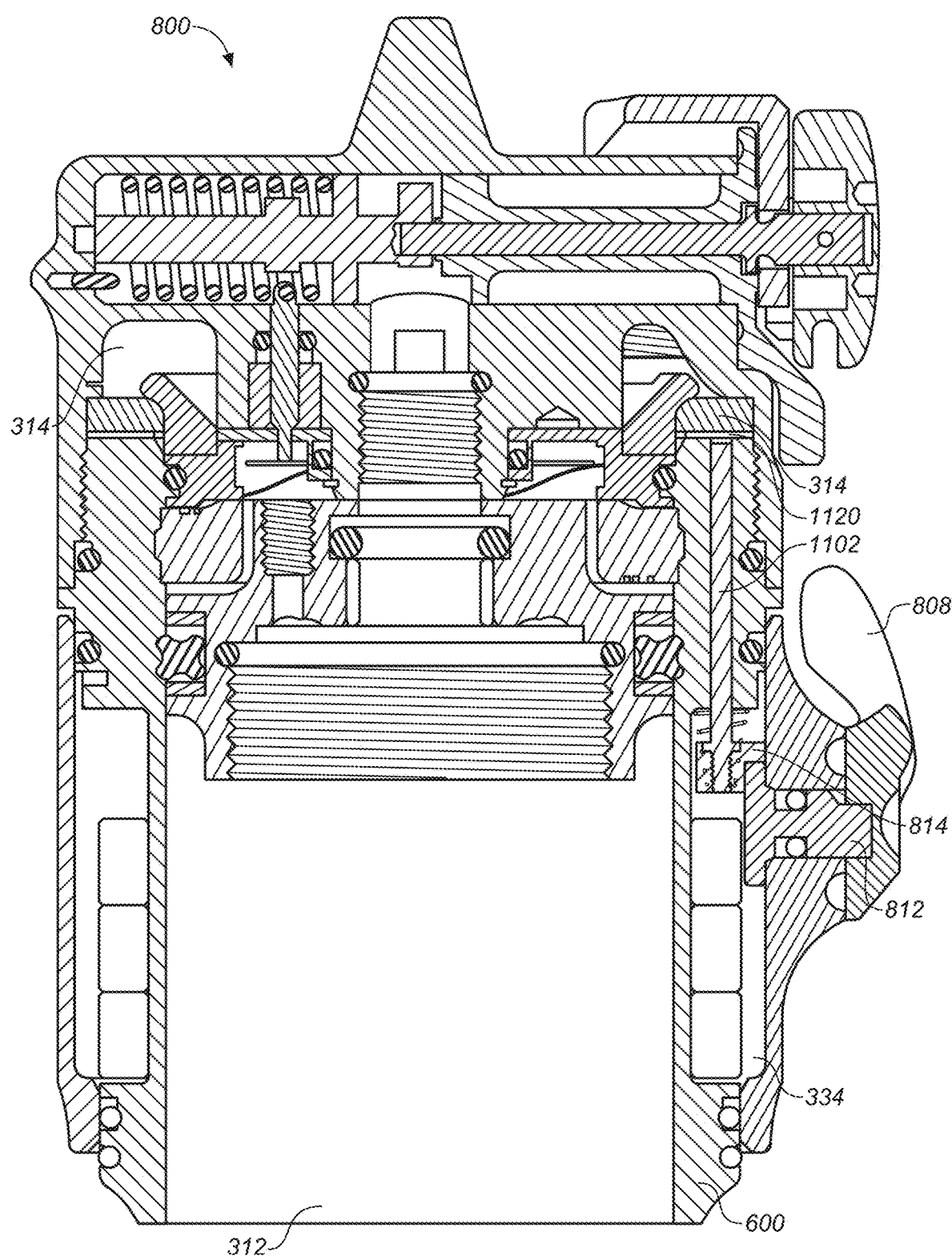
FIG. 11 is a cross-sectional side view of the multi-mode air shock with two air chamber valves, in accordance with an embodiment.

FIG. 11 is a cross-sectional side view of the multi-mode air shock 1100 with two air chamber valves, in accordance with an embodiment. the lever assembly includes lever 808, cam 812 coupled to lever 808, cam 812 rotating when lever 808 is activated, cam follower 814 coupled to cam 812, cam follower 814 moving when cam 812 is rotated. Plunger 1102 having a first end fixedly coupled to cam follower 814, plunger 1102 moving in concert with cam follower 814, plunger 1102 having a second end opposite the first end, the second end to contact and open shim 1120 in the valve when lever 808 is activated. Such that the opening of shim 1120 causes fluid communication between tertiary air chamber 334 and secondary air chamber 314 or similarly when there is only a single valve fluid communication between primary air chamber 312 and secondary air chamber 314.

FIG. 11 shows a position when the tertiary air chamber 334 is closed and not communicating with secondary air chamber 314. In one embodiment, a lever assembly includes plunger 1102 threadedly coupled with the cam follower 814. A shim 1120 (sealing plate, etc.) is in contact with the second end of plunger 1102 opposite to the end of the plunger 1102 threadedly coupled with cam follower 814. In the closed position, shim 1120 stops the communication between the secondary air chamber 314 and tertiary air chamber 334. In one embodiment, there is a wave spring that biases shim 1120 against the face of the tubular outer wall 600 to keep shim 1120 in the closed position. In one embodiment, the sealing mechanism of a shim with a wave spring is similar to the discussion herein regarding the air shock valve between the primary air chamber 312 and the secondary air chamber 314. Although a shim and a wave spring combination are discussed, it should be appreciated that there may be other objects that are capable of performing the same function. As such, the use of a shim 1120 bias is merely one method of blocking the communication between secondary air chamber 314 and tertiary air chamber 334.

In one embodiment, as lever 808 is rotated, the radius changes on cam 812 which drives cam follower 814 toward shim 1120. As cam follower 814 continues to move plunger 1102 toward shim 1120. The plunger 1102 makes contact with and props open shim 1120 to allow air flow between the secondary air chamber 314 and the tertiary air chamber 334.

Figure 12:
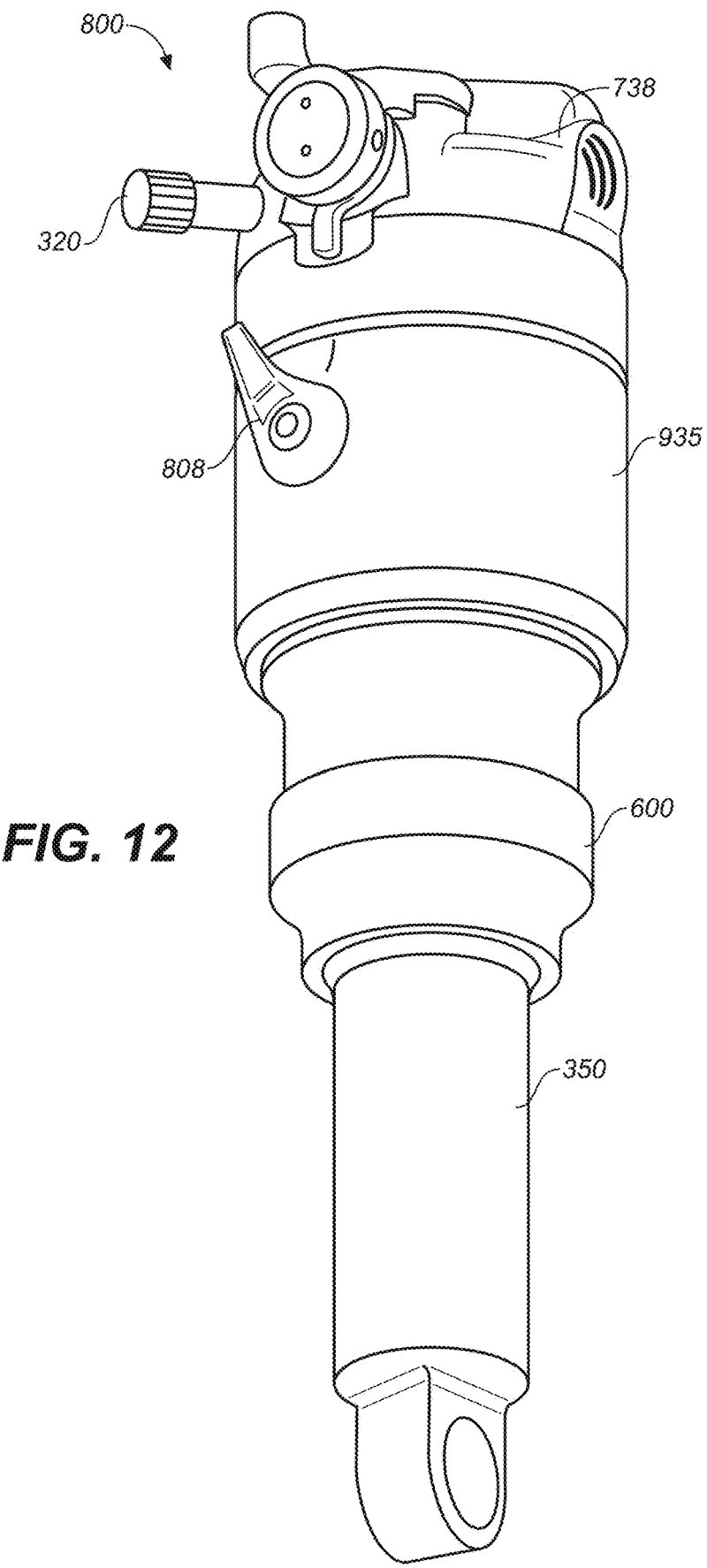
FIG. 12 is a perspective view of the multi-mode air shock having two air chamber valves, in accordance with an embodiment.

For example, shim 1120 blocks all the holes 615 until lever 808 is rotated and shim 1120 is lifted from a portion of holes 165 about the perimeter of tubular outer wall 600. The depression 621 in tubular outer wall 600 is what creates the tertiary air chamber 334 space when the sleeve FIG. 12 is a perspective view of the multi-mode air shock having two air chamber valves, in accordance with an embodiment. In one embodiment, the addition of lever 808 to control an additional volume of air, e.g., tertiary air chamber 334, for the air spring and controlling it through an annular region around the tubular outer wall 600 provides on the fly adjustability and compactness. That is, the use of an annular design for tertiary air chamber 334 allows the overall air shock 800 footprint to remain compact. Further, in one embodiment of the present invention tertiary air chamber 334 is a modular design and the addition of the tertiary air chamber 334 is completed in a modular manner. As a result it can be added or removed to adjust the operation of air shock 800 without having to redesign any components therein. The modularity also allows the overall length of air shock 800 to remain consistent thereby keeping the length of the shock within the frame geometry.

In one embodiment, lever 808 is to be nominally in the front of air shock 800. In a clocking process, (which is more expensive in manufacture time, additional processes, etc.), after the threads 633 are formed and prior to the milling of holes 615, tubular outer wall 600 could be threaded onto gusset adjuster housing 700 and then the proper location for lever 808 would be marked (indexed). Tubular outer wall 600 would then be removed from the adjuster housing and milled at the marked location.

Referring again to FIGS. 6-9, in one embodiment, to save time during the manufacturing process, a clocking process is not used. Instead, the orientation of tubular outer wall 600 with respect to gusset adjuster housing 700 is unknown prior to tubular outer wall 600 being threaded to gusset adjuster housing 700 (e.g., during the actual assembly of air shock 800). In one embodiment, tubular outer wall 600 begins as a standard piece of metal, or composite, or the like. For example, tubular outer wall 600 is a turned part with no indexing. The threading tool also forms threads 633 on tubular outer wall 600 with no indexing. However, because it is not clocked, there is only a chance that the alignment of lever 808 would be at the front of air shock 800. To resolve the location problem, in one embodiment, a pattern of holes 615 are milled in tubular outer wall 600, any of which are capable of being occupied by plunger 1102.

Moreover, as shown in FIG. 8, a number of milled features 643 (e.g., arches, semi-circles, indents, or the like) are formed in tubular outer wall 600 on the other side of the cam follower 814 valley (e.g., depression 621) opposite the milled plunger holes 615. In one embodiment, there are an equal number of milled features 643 as there are milled plunger holes 615. Further, in one embodiment, milled features 643 are offset and spaced evenly between (e.g., as opposed to being aligned with) the milled plunger holes 615.

During assembly of air shock 800, tubular outer wall 600 is threaded into gusset adjuster housing 700 and after it is torqued to the appropriate specification (e.g., in its final assembled position) the closest appropriate hole of holes 615 is used as the housing for plunger 1102. Thus, the number of milled holes 615 dictates the level of accuracy (or resolution) of how close lever 808 will be to the center line of air shock 800. For example, the closest hole for plunger 1102 might be +10 degrees of the centerline of air shock 800.

In one embodiment, if a user wanted to isolate only primary air chamber 312, using a manual method, they would depress a remote lever located in a user accessible location. For example, the remote lever could be on the handlebar, the frame, another mounted location the user prefers. In another embodiment the remote lever is on the air shock itself, or otherwise in a user accessible location. The user input on the lever would close the valve, which in operation, would turn the pulley and close off the plunger in the bulkhead between primary air chamber 312 and secondary air chamber 314.

In general, shim 1120 only closes the chamber flow in one direction, e.g., during compression. For example, in the compression direction it prevents air from the air spring flowing from tertiary air chamber 334 into secondary air chamber 314. However, in one embodiment, if air shock 800 is deep in travel and then shim 1120 is closed, shim 1120 will act as a check and will allow air to backflow from the tertiary air chamber 334 into the secondary air chamber 314 so that at top-out there is still equal pressure between the tertiary air chamber 334 and the secondary air chamber 314. However, on the subsequent compression, shim 1120 will act closed in compression thereby incorporating the higher compression ratio.

In one embodiment, if the user releases lever 808 with a release lever (the release lever may be on the handlebar, the frame, another mounted location the user prefers, on the air shock itself, or the like) the pulley will open, driving plunger 1102 down and opening shim 1120 to allow tertiary air chamber 334 to secondary air chamber 314 communication.

For example, to allow communication from secondary air chamber 314 to tertiary air chamber 334, lever 808 would be activated which would translate to a push on plunger 1102 that would apply pressure to open up shim 1120.

In one embodiment, the operation of the air shock may be a live valve. That is, one or more of lever 808 (or components operated by the levers—e.g., plunger 1102, shim 1120, or the like) will be actuated automatically based on actual terrain conditions. For example, a servo instead of a lever 808; lever 808, plunger 1102, and/or shim 1120 controlled by a servo; or some other component controlled to automatically operate plunger 1102 to open or close shim 1120.

In one embodiment, the live operation includes an electronic signal received by a receiver at the electronic lever from a computing device. For example, the user would have an app on a smart phone (or other computing device) and would control the settings via the app. Thus, when the user wanted to open or close the communication between tertiary air chamber 334 and secondary air chamber 314 (and/or primary air chamber 312 and secondary air chamber 314) they would provide the proper command from the computing device and it would be received at the live valve which would then automatically operate the plunger to open or close the shim accordingly. For example, an open signal or a close signal.

Figure 13:
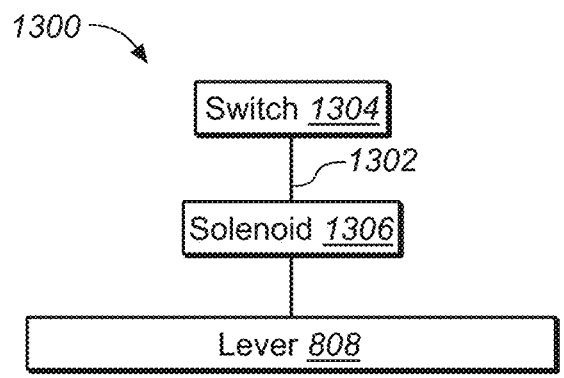
FIG. 13 is a schematic diagram showing a control arrangement for a remotely-operated adjuster, in accordance with an embodiment.

Referring now to FIG. 13, in various embodiments of the present invention, a damper valve includes a plurality of air chambers wherein the communication between the plurality of air chambers is automatically adjustable using lever 808. In one such embodiment, lever 808 is solenoid operated, hydraulically operated, pneumatically operated, or operated by any other suitable motive mechanism. Lever 808 may be operated remotely by a switch or potentiometer located in the cockpit of a vehicle or attached to appropriate operational parts of a vehicle for timely activation (e.g. brake pedal) or may be operated in response to input from a microprocessor (e.g. calculating desired settings based on vehicle acceleration sensor data) or any suitable combination of activation means. In like manner, a controller for lever 808 may be cockpit mounted and may be manually adjustable or microprocessor controlled or both or selectively either.

It may be desirable to increase the damping rate of a damper valve of a suspension damper when moving a vehicle from off-road to on highway use. Off-road use often requires a high degree of compliance to absorb shocks imparted by the widely varying terrain. On highway use, particularly with long wheel travel vehicles, often requires more rigid shock absorption to allow a user to maintain control of a vehicle at higher speeds. This may be especially true during cornering or braking.

One embodiment comprises a four-wheeled vehicle having a suspension damper equipped with a plurality of air chambers wherein the communication between the plurality of air chambers is automatically adjustable using lever 808 at each (of four) wheel. The plurality of air chambers wherein the communication between the plurality of air chambers is automatically adjustable using lever 808 (including, for example, a remotely controllable lever 808) of each of the front shock absorbers may be electrically connected with a linear switch (such as that which operates an automotive brake light) that is activated in conjunction with the vehicle brake. When the brake is moved beyond a certain distance, corresponding usually to harder braking and hence potential for vehicle nose dive, the electric switch connects a power supply to a motive force generator for lever 808 in the front shocks thereby increasing the stiffness of the damper valve in that shock. As such, the front shocks become more rigid during hard braking. Other mechanisms may be used to trigger the shocks such as accelerometers (e.g. tri-axial) for sensing pitch and roll of the vehicle and activating, via a microprocessor, the appropriate amount of rotation of lever 808 (and corresponding adjustment of the stiffness for the corresponding damper valve) for optimum vehicle control.

In one embodiment, a vehicle steering column includes right turn and left turn limit switches such that a hard turn in either direction activates the appropriate adjustment of lever 808 (and corresponding adjustment of the communication between the one or more air chambers for the corresponding damper valve) of shocks opposite that direction (for example, a hard, right turn would cause more rigid shocks on the vehicle's left side). Again, accelerometers in conjunction with a microprocessor and a switched power supply may perform the lever 808 activation function by sensing the actual g-force associated with the turn (or braking; or acceleration for the rear shock activation) and triggering the appropriate amount of rotation of lever 808 (and corresponding adjustment of the stiffness for the corresponding damper valve) at a preset threshold g-force.

FIG. 13 is a schematic diagram showing a control arrangement 1300 for a remotely-operated lever 808. As illustrated, a signal line 1302 runs from a switch 1304 to a solenoid 1306. Thereafter, the solenoid 1306 converts electrical energy into mechanical movement and shifts position of lever 808, thereby adjusting communication between the plurality of air chambers and varying the stiffness of a corresponding damper. While FIG. 13 is simplified and involves control of a single lever 808, it will be understood that any number of levers corresponding to any number of selectively coupled air chambers for a corresponding number of dampers could be operated simultaneously or separately depending upon needs in a vehicular suspension system. Additional switches could permit individual operation of separate remotely-operable levers.

As discussed, a remotely-operable lever 808 like the one described above is particularly useful with an on-/off-road vehicle. These vehicles can have more than 20" of shock absorber travel to permit them to negotiate rough, uneven terrain at speed with usable shock absorbing function. In off-road applications, compliant dampening is necessary as the vehicle relies on its long travel suspension when encountering often large off-road obstacles. Operating a vehicle with very compliant, long travel suspension on a smooth road at road speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may include excessive pitch and yaw during braking and/or acceleration. With the remotely-operated lever 808, communication between the plurality of air chambers and, correspondingly, the dampening characteristics of a shock absorber can be changed for higher speeds on a smooth road.

Figure 14:
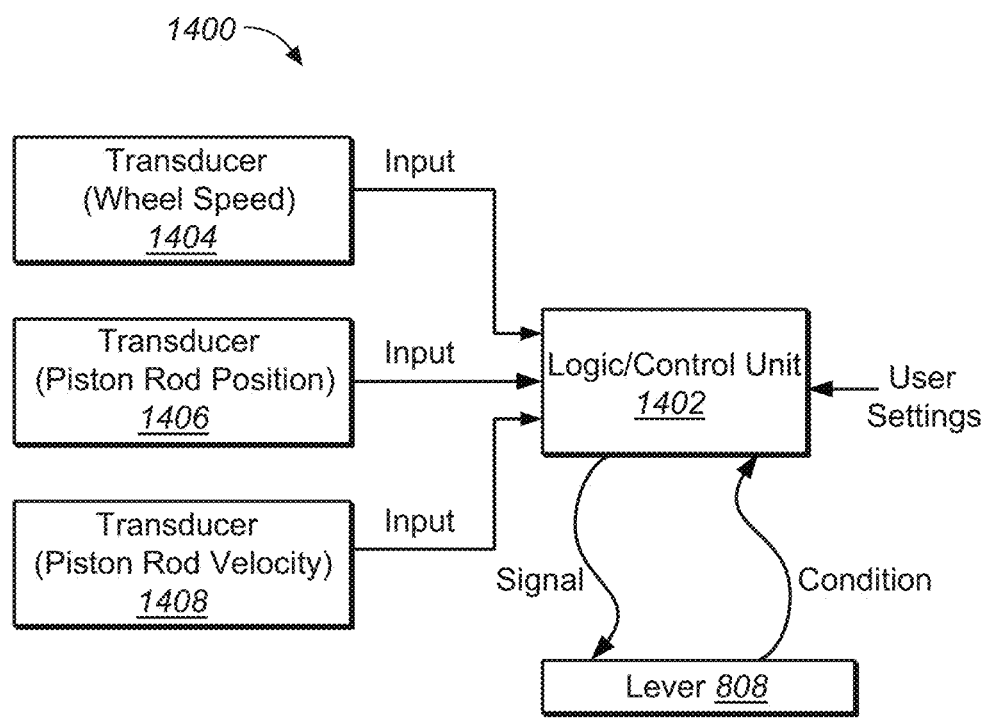
FIG. 14 is a schematic diagram of a remote-control system based upon any or all of vehicle speed, damper rod speed, and damper rod position, in accordance with an embodiment.

In addition to, or in lieu of, the simple, switch-operated remote arrangement of FIG. 13, the remotely-operable lever 808 can be operated automatically based upon one or more driving conditions. FIG. 14 shows a schematic diagram of a remote-control system 1400 based upon any or all of vehicle speed, damper rod speed, and damper rod position. One embodiment of the arrangement of FIG. 14 is designed to automatically increase dampening in a shock absorber in the event a damper rod reaches a certain velocity in its travel towards the bottom end of a damper at a predetermined speed of the vehicle. In one embodiment, the system 1400 adds dampening (and control) in the event of rapid operation (e.g. high rod velocity) of the damper to avoid a bottoming out of the damper rod as well as a loss of control that can accompany rapid compression of a shock absorber with a relative long amount of travel. In one embodiment, the system 1400 adds dampening (e.g., adjusts communication between the plurality of air chambers) in the event that the rod velocity in compression is relatively low but the rod progresses past a certain point in the travel. Such configuration aids in stabilizing the vehicle against excessive low-rate suspension movement events such as cornering roll, braking and acceleration yaw and pitch and "g-out."

FIG. 14 illustrates, for example, a system 1400 including three variables: wheel speed, corresponding to the speed of a vehicle (measured by wheel speed transducer 1404), piston rod position (measured by piston rod position transducer 1406), and piston rod velocity (measured by piston rod position transducer 1408). Any or all of the variables shown may be considered by logic unit 1402 in controlling the solenoids or other motive sources coupled to lever 808 for changing the communication between the plurality of air chambers. Any other suitable vehicle operation variable may be used in addition to or in lieu of the variables 1404, 1406, and 1408 such as, for example, piston rod compression strain, eyelet strain, vehicle mounted accelerometer (or tilt/inclinometer) data or any other suitable vehicle or component performance data. In one embodiment, the piston's position within the damping chamber is determined using an accelerometer to sense modal resonance of the suspension damper. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper. In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 1408), and piston rod position (piston rod position transducer 1406), a separate wheel speed transducer 1404 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 14, the logic unit 1402 with user-definable settings receives inputs from piston rod position transducer 1406, piston rod velocity transducer 1408, as well as wheel speed transducer 1404. Logic unit 1402 is user-programmable and, depending on the needs of the operator, logic unit 1402 records the variables and, then, if certain criteria are met, logic unit 1402 sends its own signal to lever 808. Thereafter, the condition, state or position of lever 808 is relayed back to logic unit 1402.

In one embodiment, logic unit 1402 shown in FIG. 14 assumes a single lever 808 corresponding to a plurality of selectively coupleable air chambers of a single damper, but logic unit 1402 is usable with any number of levers or groups of levers corresponding to any number of dampers or groups of dampers. For instance, the dampers on one side of the vehicle can be acted upon while the vehicles other dampers remain unaffected.

While the examples illustrated relate to manual operation and automated operation based upon specific parameters, the remotely-operated lever 808 can be used in a variety of ways with many different driving and road variables. In one example, lever 808 is controlled based upon vehicle speed in conjunction with the angular location of the vehicle's steering wheel. In this manner, by sensing the steering wheel turn severity (angle of rotation), additional dampening (by adjusting the communication between the plurality of air chambers) can be applied to one damper or one set of dampers on one side of the vehicle (suitable for example to mitigate cornering roll) in the event of a sharp turn at a relatively high speed. In another example, a transducer, such as an accelerometer, measures other aspects of the vehicle's suspension system, like axle force and/or moments applied to various parts of the vehicle, like steering tie rods, and directs change to position of lever 808 (and corresponding change to the coupling of a plurality of air chambers) in response thereto. In another example, lever 808 is controlled at least in part by a pressure transducer measuring pressure in a vehicle tire and adding dampening characteristics to some or all of the wheels (by changing the communication between the plurality of air chambers) in the event of, for example, an increased or decreased pressure reading. In one embodiment, lever 808 is controlled in response to braking pressure (as measured, for example, by a brake pedal (or lever) sensor or brake fluid pressure sensor or accelerometer). In still another example, a parameter might include a gyroscopic mechanism that monitors vehicle trajectory and identifies a "spin-out" or other loss of control condition and adds and/or reduces dampening to some or all of the vehicle's dampers (by changing the communication between the plurality of air chambers) in the event of a loss of control to help the operator of the vehicle to regain control.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A multi-mode air shock comprising:
   an air spring, the air spring comprising:
   a primary air chamber formed by a tubular outer wall;
   a damper, the damper partially inserted into an opening on one end of the air spring, the damper comprising:
   an insertion end to telescope within the primary air chamber; and
   a coupler to couple with a portion of a vehicle;
   an adjuster housing, the adjuster housing fixedly coupled to an end of the air spring opposite of the opening into which the damper is partially inserted, the adjuster housing comprising:
   a secondary air chamber, the secondary air chamber in fluid communication with the primary air chamber;
   a mounting structure to couple with a different portion of the vehicle;
   a bulkhead between the primary air chamber and the secondary air chamber, the bulkhead comprising:
   a valve to open or close the fluid communication between the primary air chamber and the secondary air chamber; and
   a tertiary air chamber, the tertiary air chamber in fluid communication with said secondary air chamber,
   the tertiary air chamber is an air sleeve coupled about an outside perimeter of at least a portion of the air spring,
   the tertiary air chamber not in fluid communication with said primary air chamber except via said secondary air chamber;
   a lever assembly, the lever assembly to operate the valve, the lever assembly comprising:
   a lever;
   a cam coupled to the lever, the cam rotating when the lever is activated;
   a cam follower coupled to the cam, the cam follower moving when the cam is rotated, the cam follower having at least one support wing; and
   a plunger having a first end fixedly coupled to the cam follower, the plunger moving in concert with the cam follower,
   the plunger having a second end opposite the first end, the second end to contact and open a shim in the valve when the lever is activated,
   the opening of the shim causing fluid communication between the primary air chamber and the secondary air chamber.

2. The multi-mode air shock of claim 1, wherein the tertiary air chamber is a modular design that can be added, removed, or replaced without affecting any other components of the multi-mode air shock.

3. The multi-mode air shock of claim 1, wherein the tertiary air chamber is removably coupled about the outside perimeter of the at least a portion of the air spring.

4. The multi-mode air shock of claim 1, wherein the tertiary air chamber is removably coupled about the outside perimeter of an entirety of the air spring.

5. The multi-mode air shock of claim 1, further comprising:
   a volume spacer, the volume spacer removably coupled with said tertiary air chamber,
   the volume spacer to reduce an air volume of said tertiary air chamber when it is coupled with said tertiary air chamber,
   the volume spacer used to adjust a compression ratio for the multi-mode air shock when a stroke length of the multi-mode air shock is changed.

6. The multi-mode air shock of claim 1, further comprising:
   a remote lever coupled to the lever assembly,
   the remote lever located in a user accessible location,
   the remote lever to receive a user input to open or close the valve.

7. The multi-mode air shock of claim 1, wherein the tubular outer wall comprises:
   a depression in a central exterior portion thereof;
   a plurality of threads about an outside portion of one end of the tubular outer wall, the plurality of threads stopping before the depression;
   a pattern of holes axially through the tubular outer wall covered by the plurality of threads,
   the pattern of holes within the tubular outer wall and perpendicular to the plurality of threads; and
   a pattern of indentations in the tubular outer wall on a side of the depression opposite of the pattern of holes,
   the pattern of indentations offset from the pattern of holes.

8. The multi-mode air shock of claim 7, further comprising:
   a plunger inserted through a hole from the pattern of holes that is closest to a center line of the tubular outer wall; and a cam follower in the depression of the tubular outer wall, the plunger coupled with the cam follower.

9. The multi-mode air shock of claim 8, further comprising:
a tab on an internal side of said air sleeve, said tab to provide clocking with an indentation of said pattern of indentations;
a lever hole though said air sleeve, said lever hole oriented with a tab to center said lever hole above said cam follower; and
a lever having a cam,
the cam to pass through the lever hole and couple with the cam follower.

10. A multi-mode air shock comprising:
an air spring, the air spring comprising:
a primary air chamber formed by a tubular outer wall;
a damper, the damper partially inserted into an opening on one end of the air spring, the damper comprising:
an insertion end to telescope within the primary air chamber; and
a coupler to couple with a portion of a vehicle;
an adjuster housing, the adjuster housing fixedly coupled to an end of the air spring opposite of the opening into which the damper is partially inserted, the adjuster housing comprising:
a secondary air chamber, the secondary air chamber in communication with the primary air chamber;
a mounting structure to couple with a different portion of the vehicle;
a bulkhead between the primary air chamber and the secondary air chamber, the bulkhead comprising:
a first valve to control a fluid communication between the primary air chamber and the secondary air chamber; and
a tertiary air chamber, the tertiary air chamber in fluid communication with said secondary air chamber,
the tertiary air chamber is an air sleeve coupled about an outside perimeter of at least a portion of the air spring,
the tertiary air chamber not in fluid communication with said primary air chamber; and
a second valve to control a fluid communication between the secondary air chamber and the tertiary air chamber, the first valve and the second valve being independently operable;
a lever assembly, the lever assembly to operate the second valve, the lever assembly comprising:
a lever;
a cam coupled to the lever, the cam rotating when the lever is activated;
a cam follower coupled to the cam, the cam follower moving when the cam is rotated, the cam follower having at least one support wing; and
a plunger having a first end fixedly coupled to the cam follower, the plunger moving in concert with the cam follower,
the plunger having a second end opposite the first end, the second end to contact and open a shim in the second valve when the lever is activated,
the opening of the shim causing fluid communication between the secondary air chamber and the tertiary air chamber.

11. The multi-mode air shock of claim 10, wherein the tertiary air chamber is removably coupled about the outside perimeter of the at least the portion of the air spring.

12. The multi-mode air shock of claim 10 further comprising:
a volume spacer, the volume spacer removably coupled with said tertiary air chamber,
the volume spacer to reduce an air volume of said tertiary air chamber when it is coupled with said tertiary air chamber,
the volume spacer used to adjust a compression ratio for the multi-mode air shock when a stroke length of the multi-mode air shock is changed.

13. The multi-mode air shock of claim 10, wherein the tertiary air chamber is a modular design that can be added, removed, or replaced without affecting any other components of the multi-mode air shock.

14. The multi-mode air shock of claim 10, wherein the tubular outer wall comprises: a depression in a central exterior portion thereof;
a plurality of threads about an outside portion of one end of the tubular outer wall, the plurality of threads stopping before the depression;
a pattern of holes axially through a portion of the tubular outer wall covered by the plurality of threads,
the pattern of holes within the tubular outer wall and perpendicular to the plurality of threads; and
a pattern of indentations in the tubular outer wall on a side of the depression opposite of the pattern of holes,
the pattern of indentations offset from the pattern of holes.

15. The multi-mode air shock of claim 14, further comprising:
a plunger inserted through a hole from the pattern of holes that is closest to a center line of the tubular outer wall; and
a cam follower in the depression of the tubular outer wall, the plunger coupled with the cam follower.

16. The multi-mode air shock of claim 15, further comprising:
a tab on an internal side of said air sleeve, said tab to provide clocking with an indentation of said pattern of indentations;
a lever hole though said air sleeve, said lever hole oriented with a tab to center said lever hole above said cam follower; and
a lever having a cam,
the cam to pass through the lever hole and couple with the cam follower.

17. A multi-mode air shock comprising:
an air spring, the air spring comprising:
a primary air chamber formed by a tubular outer wall;
a damper, the damper partially inserted into an opening on one end of the air spring, the damper comprising:
an insertion end to telescope within the primary air chamber; and
a coupler to couple with a portion of a vehicle;
an adjuster housing, the adjuster housing fixedly coupled to an end of the air spring opposite of the opening into which the damper is partially inserted, the adjuster housing comprising:
a secondary air chamber, the secondary air chamber in communication with the primary air chamber;
a mounting structure to couple with a different portion of the vehicle;
a bulkhead between the primary air chamber and the secondary air chamber, the bulkhead comprising:
a first valve to control a fluid communication between the primary air chamber and the secondary air chamber; and
a tertiary air chamber, the tertiary air chamber in fluid communication with said secondary air chamber, the tertiary air chamber is an air sleeve coupled about an outside perimeter of at least a portion of the air spring, the tertiary air chamber not in fluid communication with said primary air chamber;

a second valve to control a fluid communication between the secondary air chamber and the tertiary air chamber, the first valve and the second valve being independently operable; and a volume spacer, the volume spacer removably coupled with said tertiary air chamber, the volume spacer to reduce an air volume of said tertiary air chamber when it is coupled with said tertiary air chamber, the volume spacer used to adjust a compression ratio for the multi-mode air shock when a stroke length of the multi-mode air shock is changed, wherein the tertiary air chamber is removably coupled about the outside perimeter of the at least the portion of the air spring.

\* \* \* \* \*